United States Patent
Fahmie

(10) Patent No.: US 10,016,683 B2
(45) Date of Patent: Jul. 10, 2018

(54) REAL TIME PHYSICAL REALITY IMMERSIVE EXPERIENCES HAVING GAMIFICATION OF ACTIONS TAKEN IN PHYSICAL REALITY

(71) Applicant: GAME COMPLEX, INC., Austin, TX (US)

(72) Inventor: Brian Fahmie, La Jolla, CA (US)

(73) Assignee: GAME COMPLEX, Inc., Austin, TX (US)

( * ) Notice: Subject to any disclaimer, the term of this patent is extended or adjusted under 35 U.S.C. 154(b) by 905 days.

(21) Appl. No.: 14/482,728

(22) Filed: Sep. 10, 2014

(65) Prior Publication Data

US 2016/0067609 A1    Mar. 10, 2016

Related U.S. Application Data

(60) Provisional application No. 61/611,489, filed on Mar. 15, 2012.

(51) Int. Cl.
*A63F 13/65* (2014.01)
*A63F 13/60* (2014.01)

(52) U.S. Cl.
CPC .............. *A63F 13/65* (2014.09); *A63F 13/60* (2014.09)

(58) Field of Classification Search
CPC ................................ A63F 13/60; A63F 13/65
USPC ........................................................ 463/29
See application file for complete search history.

(56) References Cited

U.S. PATENT DOCUMENTS

| | | | | |
|---|---|---|---|---|
| 5,320,362 A | * | 6/1994 | Bear | A63F 9/0291 273/445 |
| 5,393,074 A | * | 2/1995 | Bear | A63F 9/0291 273/440 |
| 5,679,075 A | * | 10/1997 | Forrest | A63F 13/005 463/9 |
| 5,853,332 A | * | 12/1998 | Briggs | A63B 9/00 472/128 |
| 6,073,489 A | * | 6/2000 | French | A63B 24/0003 73/379.01 |
| 6,159,100 A | * | 12/2000 | Smith | A63F 13/10 434/55 |
| 7,373,377 B2 | * | 5/2008 | Altieri | G06Q 30/02 345/418 |

(Continued)

FOREIGN PATENT DOCUMENTS

| | | |
|---|---|---|
| JP | 2001-029503 | 6/2001 |
| JP | 2001-124580 | 11/2001 |

(Continued)

OTHER PUBLICATIONS

International Search Report issued in PCT/US2013/032377 dated Jul. 10, 2013.

(Continued)

*Primary Examiner* — Omkar Deodhar
*Assistant Examiner* — Shauna-Kay Hall
(74) *Attorney, Agent, or Firm* — Patnstr, APC; Peter Jon Gluck

(57) ABSTRACT

A real time physical reality immersive experience having gameification of actions taken in physical reality combines endurance events and gaming aspects to create a novel entertainment systems, methods, and apparatus, including Modular Efficiently Transformable Assembly Structures (METAS).

2 Claims, 10 Drawing Sheets

(56) References Cited

U.S. PATENT DOCUMENTS

| | | | |
|---|---|---|---|
| 7,614,958 B2 * | 11/2009 | Weston | A63G 31/00 463/15 |
| 7,901,292 B1 | 3/2011 | Uhlir et al. | |
| 2004/0033833 A1 | 2/2004 | Briggs et al. | |
| 2004/0077423 A1 * | 4/2004 | Weston | A63G 31/00 472/137 |
| 2010/0009809 A1 | 1/2010 | Carrington | |
| 2010/0302142 A1 | 12/2010 | French et al. | |
| 2011/0197157 A1 | 8/2011 | Hoffman et al. | |
| 2012/0166146 A1 * | 6/2012 | Cincotti | F41H 3/00 703/1 |

FOREIGN PATENT DOCUMENTS

| | | |
|---|---|---|
| KR | 10-2009-0122875 | 12/2009 |
| WO | 2009-153350 A1 | 12/2009 |
| WO | WO2010033826 A2 | 3/2010 |
| WO | 2011-069112 A1 | 6/2011 |

OTHER PUBLICATIONS

International Publication WO 2013/138764, dated Sep. 19, 2013, with ISR.
Extended European Search Report, dated Sep. 11, 2015, 7 pages.

* cited by examiner

FIG. 3   Instance Overview

REAL TIME PHYSICAL REALITY IMMERSIVE EXPERIENCES HAVING GAMIFICATION OF ACTIONS TAKEN IN PHYSICAL REALITY

RELATED APPLICATION

The present application claims the benefit of and priority to Patent Cooperation Treaty application serial number PCT/US2013/032377, filed Mar. 15, 2013, which claims priority to U.S. provisional patent application Ser. No. 61/611,489, filed Mar. 15, 2012, the contents of each application are incorporated by reference herein in their entirety.

BACKGROUND OF THE DISCLOSURE

Forms of traditional entertainment such as video games, movies, and television create a simulated reality. These forms of entertainment are limited in how someone can interact with the medium. In the case of a video game (and web and mobile games) a player can only interact with the game through it's designed medium, traditionally a digital medium utilizing a graphical user interface with a set of control mechanisms. On the one hand, the player uses these control mechanisms to take actions in the game causing reactions and progression of the game state, which is generally reflected visually and/or aurally via the graphical user interface through the digital medium. The player is controlling part of this simulated reality through these control mechanisms, which in conjunction with the game engine itself, constitutes the basis for video games and their respective counterparts such as web and mobile games.

On the other hand, athletic endurance events such as walking, foot races, triathlons, and obstacle races test a participant's physical athletic performance by measuring the time it takes them to complete the event's course. Current athletic endurance events use a predetermined course that participants must travel between the start and finish lines. Courses can vary in a number of factors depending on the event type, including, but not limited to: total distance, vertical gain and loss, terrain, obstacles that must be completed before continuing on as found in obstacle races, and as is the case in multi-sport races, different types of locomotion that must be used to traverse specific sections of a course. At the conclusion of almost all of these athletic endurance events, participants are placed into results based rankings, based on the elapsed time it took to complete the course for each participant in an ascending order, with the fastest (shortest elapsed time) participant placing first, and the slowest (longest elapsed time) participant placing last.

In almost all of these types of athletic endurance events, participants are given a unique identifier, commonly referred to as a timing chip within the endurance race community, which uniquely identifies the elapsed time each participant took to complete the course (their result) within the event. These timing chips allow the event organizer to distinguish each participant's result from one another and place participants into results based standings in the appropriate order based on the elapsed time of each participant in an ascending order, with the fastest (shortest elapsed time) participant placing first, and the slowest (longest elapsed time) participant placing last.

The most widely used technology at present for capturing and managing these timing chips is Radio Frequency Identification (RFID). There are a number of different types of RFID technology (High Frequency [HF] and Ultra High Frequency [UHF] for example) in the market used by current athletic endurance events, however they all work to accomplish the same goal: utilizing RFID tags (the unique identifier) worn by each participant to record timestamps at various data capture spots along an event's course such as exact start time, finish time, and sometimes as 'split times' at pre-determined intervals such as the halfway point on a marathon. These timestamps are recorded instantly and automatically as a participant's timing chip passes through an RFID field that's being generated by an RFID Reader at these various data capture spots. The majority of current athletic endurance events only use 2 of these timestamps to determine a participant's result (elapsed time) and therefore place in the final event standings; one to record the exact start time of each participant and one to record the exact finish time of each participant, the duration of time (elapsed time) between these two timestamps resulting in a participant's total amount of time they took to complete the course and thus their result. At the conclusion of the entire event a participant's place within standings is determined by their total elapsed time (their result). The advent of the instant teachings services to modify these distinct galaxies and in so doing, constitutes invention.

SUMMARY OF THE DISCLOSURE

Briefly stated, the summation of this disclosure collectively creates a real time physical reality immersive experience having gameification of actions taken in physical reality.

The proposed novel concept is a real time physical reality immersive experience having gamification of actions taken in physical reality. These experiences consist of a physical medium in which participants traverse a course that has multiple checkpoints and challenges that a participant must pass through and/or complete between the start and finish areas, with the exact completion combination of the course left up to participants to decide for themselves. At checkpoints, each participant is presented a plurality of choices and/or routes either through that checkpoint or from that checkpoint to the next checkpoint. This plurality of choices at checkpoints creates a nearly limitless number of possible completion combinations that participants may use to traverse a course. Each participant is given a unique identifier that is affixed to him or her during the entire experience. This unique identifier tracks, captures, records, and stores all of their choices made and actions taken along a course, the accumulation of which determines their exact completion combination they used to traverse the course with.

Implementation of the proposed novel concept of a real time physical reality immersive experience having gameification of actions taken in physical reality, consisting of a physical medium, in which participants traverse a course that has an undetermined and/or multiple completion combinations, leads to and necessitates an additional novel concept relating to participant results of the experience. This additional concept can be defined that participants accumulate points at each checkpoint based on the choice(s) they make at that checkpoint. Individual point values are assigned to each choice. At the conclusion of the experience, results and rankings are calculated using the points accumulated, the choices made, and the actions taken by each participant. Participant results and rankings based on points accumulated, conscious choices made, and actions taken by each participant instead of a participant's total elapsed time create a game-like strategy within the real time physical reality immersive experience.

These novel concepts necessitate and also incorporate various other novel concepts. These additional novel concepts are contained within this detailed disclosure. The summation of these enclosed novel concepts collectively create a real time physical reality immersive experience having gameification of actions taken in physical reality.

Portions of these novel concepts of a real time physical reality immersive experience described in detail below utilize the above-described RFID technology at present in a completely new and innovative way. However, these novel concepts are not directly tied to this technology. As technology changes and improves, so too will the technology these novel concepts utilize for their implementation. For example, Indoor Positioning System (IPS), Infrared Stereoscopic Cameras, or any future technology not yet known, could be utilized in place of RFID.

DETAILED DESCRIPTION OF THE DISCLOSURE

Physical Medium

The present inventor has combined traditional athletic competitions and gaming to generate gamefication of real time physical reality, heretofore unrealized.

The novel real time physical reality immersive experience consists of a physical medium in which participants traverse a course from a starting point to a finishing point. As illustrated, for example, in FIGS. 1-3, simultaneous programming architecture allows multiple versions, uses, and instances.

A course is defined as a route of measurable distance through three-dimensional space that has a starting point and a finishing point.

Traverse is defined as any measurable physical movement, by any means of movement, along a course.

Along the course, participants encounter checkpoints.

Checkpoints are defined as a specific section of a course that contains 1 or more challenges.

Challenges are defined as physical, mental, and/or dexterous activities; and/or different routes from checkpoint to checkpoint.

Challenges are of natural and/or man-made origin. Challenges at times may utilize technology, software and/or hardware systems, to facilitate the challenge's activity(s) and/or routes.

Participants must pass through each checkpoint by choosing to complete, or attempt to complete, one, or sometimes more than one, of the challenges at that checkpoint. After a participant completes, or attempts to complete, their selected challenge(s) required of them at a checkpoint, they can continue traversing along the course to the next checkpoint.

In the case of challenges being different route options from one checkpoint to another checkpoint, participants must choose to take one of the presented route options to get to the next checkpoint.

Participants continue their traverse of the course from the starting point to the finishing point through each checkpoint along the course, thereby completing the experience.

Experience Operations

The real time physical reality immersive experience has multiple control systems, some of which are detailed within this disclosure. All of these control systems, detailed or yet defined, are designed, programmed, managed, controlled, and/or updated by an operational team of people called the operations team. These systems can be automatically and/or manually controlled depending on each system's specific requirements.

Master Control System

The master control system is a technical system of software and hardware systems that control all the versions, and their respective locations, of the real time physical reality immersive experience.

Figure 1:
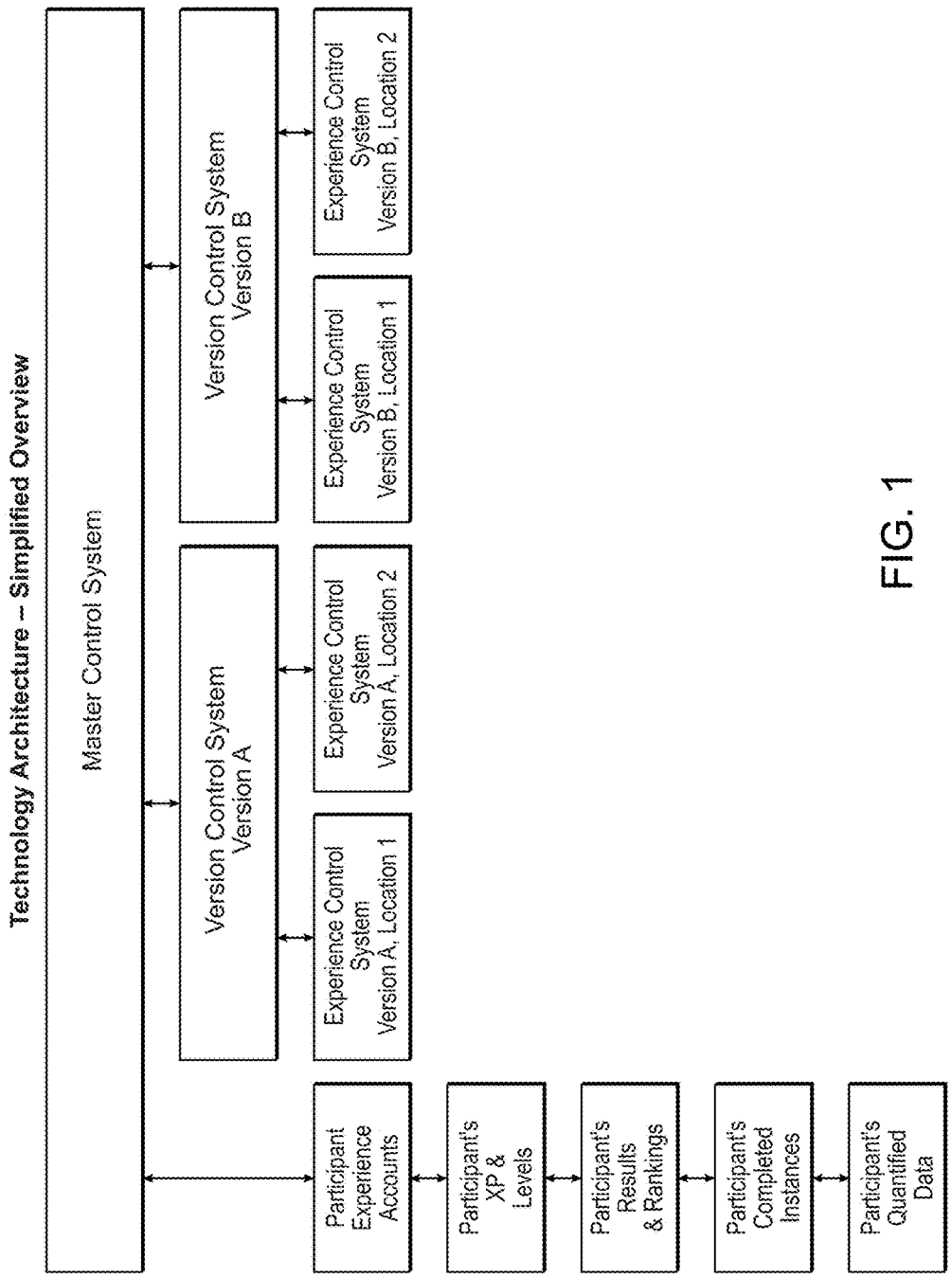
FIG. 1 shows an organizational process diagram of the technology architecture of the instant disclosure.

Referring still to FIG. 1, the master control system allows the operations team to design, program, manage, control, and/or update any possible system utilized by the real time physical reality immersive experience.

Versioning

Figure 2:
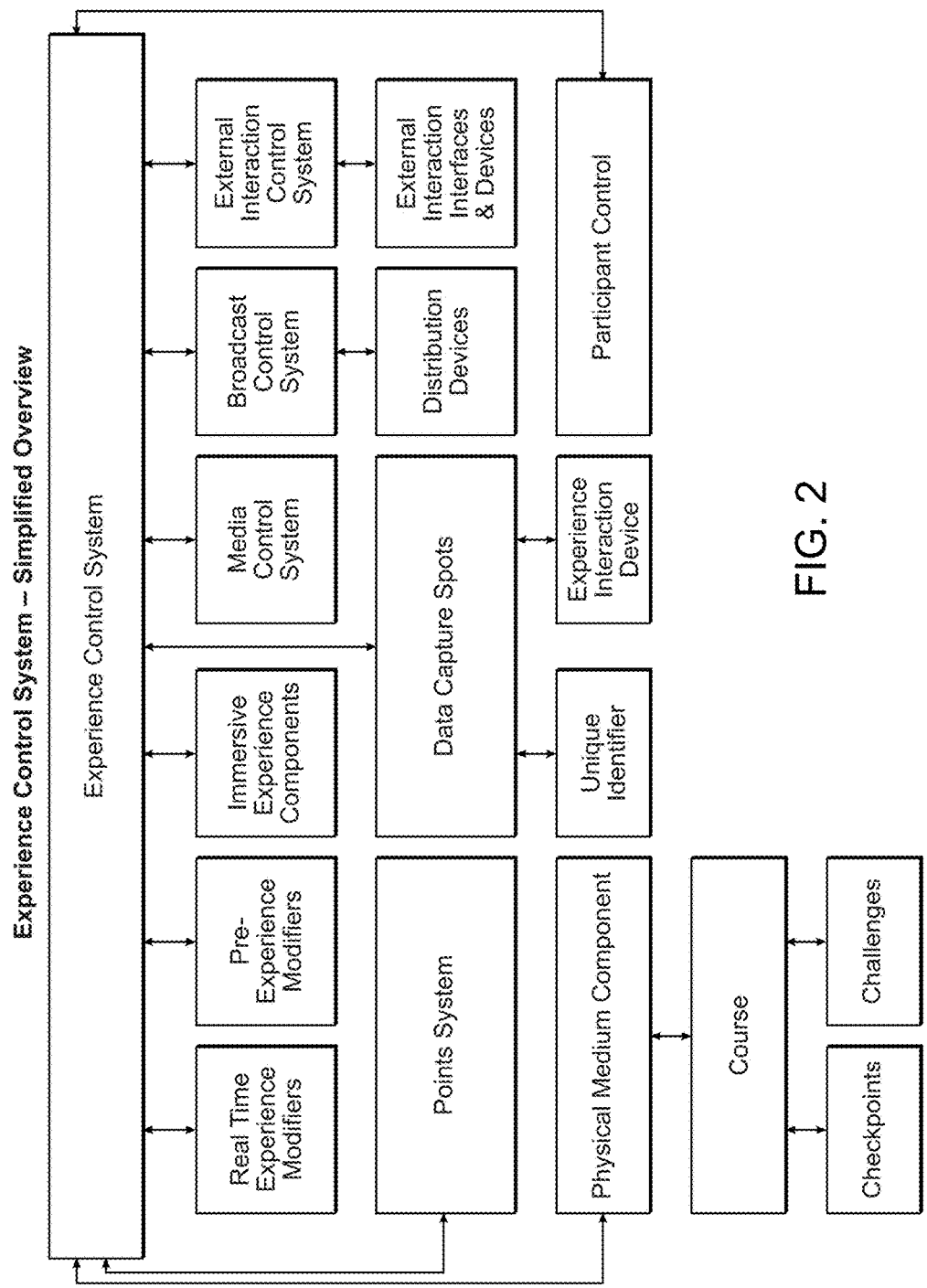
FIG. 2 shows an organizational process diagram of experience control system of the instant disclosure.
Figure 3:
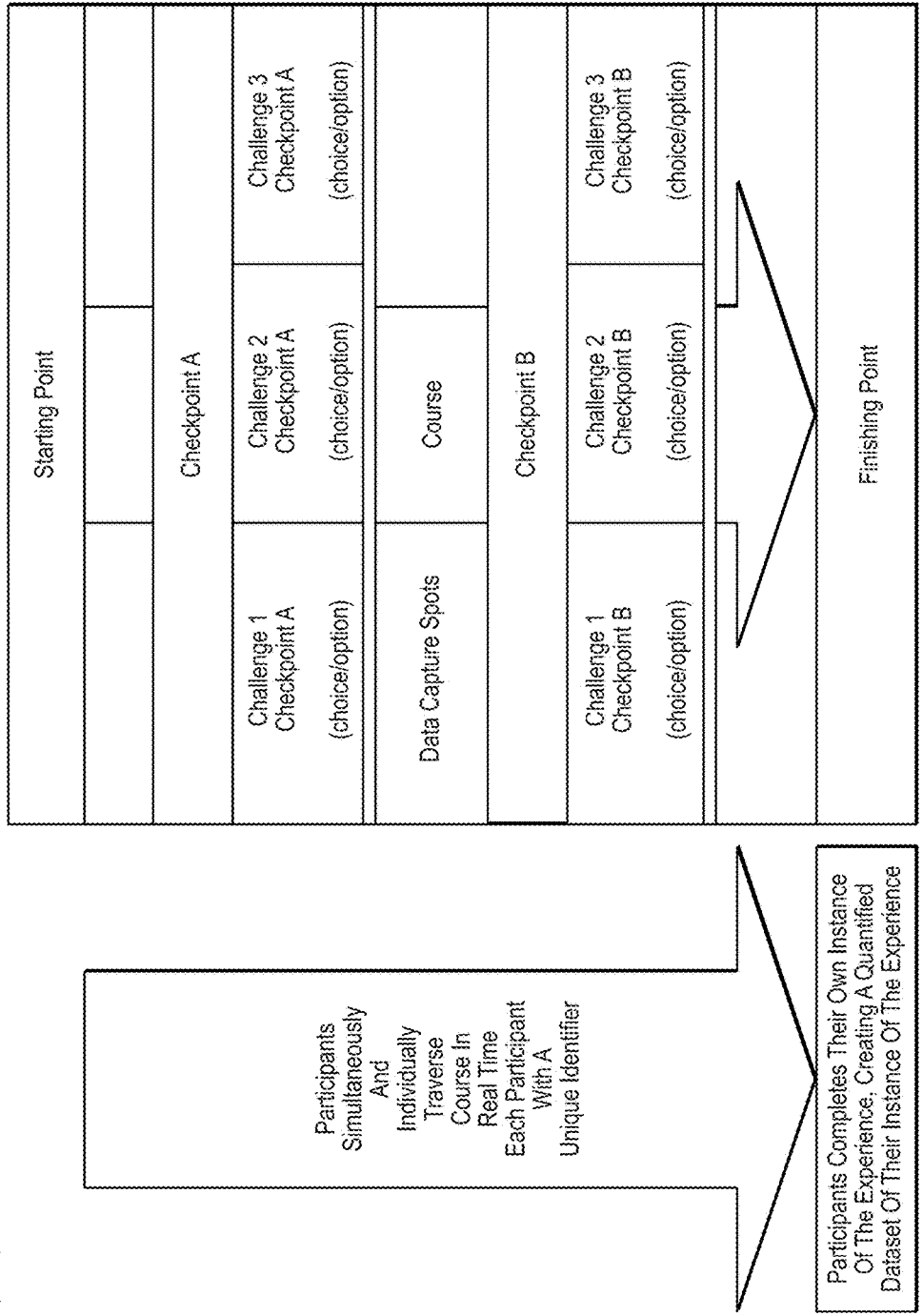
FIG. 3 shows an organizational process diagram of the physical medium overview of the instant disclosure.
Figure 4:
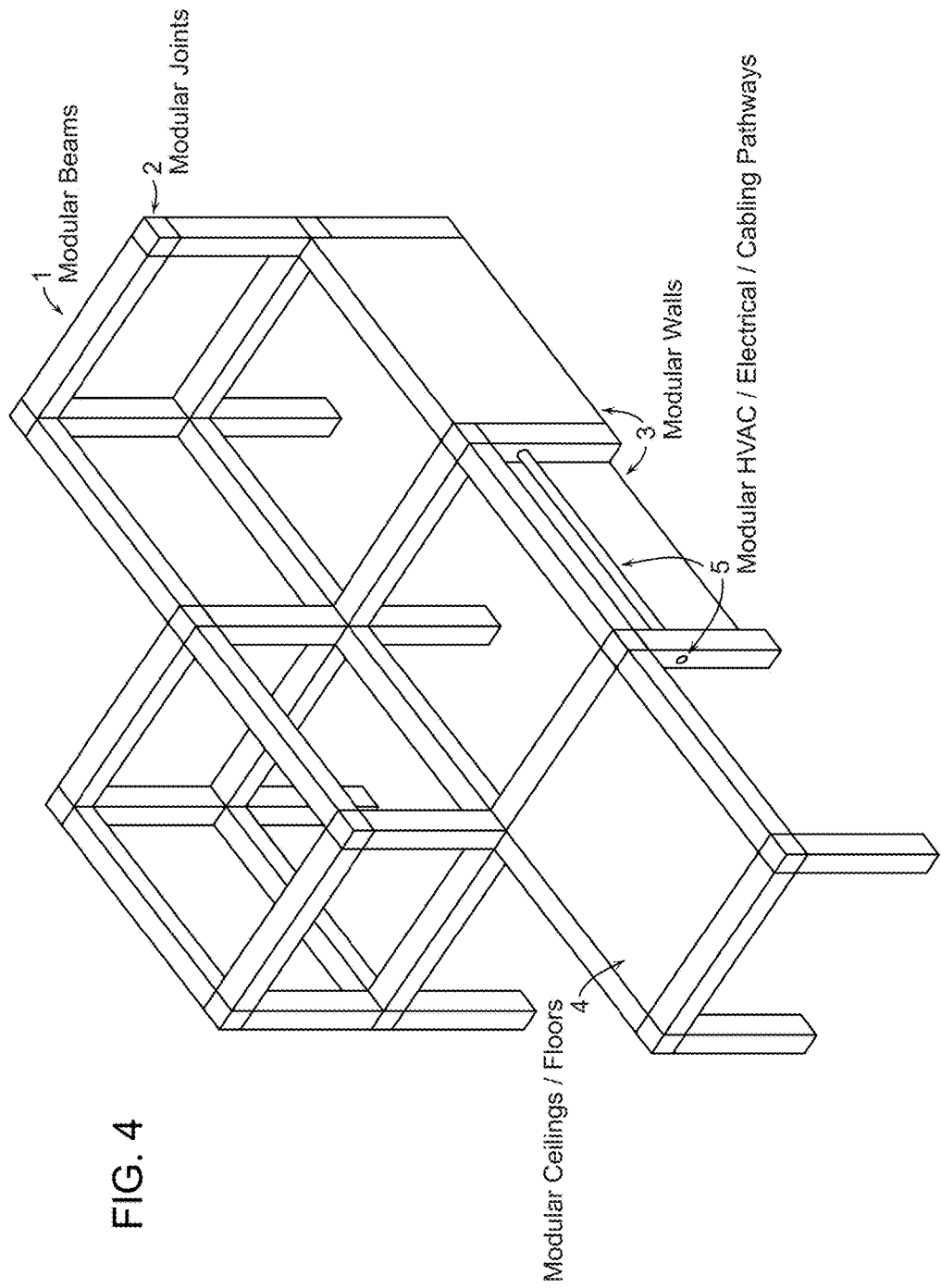
FIG. 4 shows a construction schematic of the modular structural elements of the instant disclosure.

Referring now also to FIGS. 2 and 3 the real time physical reality immersive experience is designed to allow different versions of the experience to exist concurrently. Versions of the experience can differ in any number of ways, including, but not limited to, course design, checkpoint and/or challenge differences, production methods, technology, or any other differing elements which cause the experiences to not be identical.

Each version of the experience has its own version control system, which is a technical system of software and hardware systems that control each version of the real time physical reality immersive experience. Each version control system communicates with the master control system in real time via data transmissions.

Multiple Locations

The real time physical reality immersive experience is designed to allow production of multiple locations of a version of the experience so that they may exist concurrently anywhere in the world. Each location of a version of the experience has its own experience control system, which is a technical system of software and hardware systems that control the entire experience at that specific location. Each location's experience control system communicates with its version control system in real time via data transmissions.

Some versions of the real time physical reality immersive experience utilize production methods, such as being housed within an enclosed indoor establishment, that necessitate additional safety, emergency, and/or other possible technical systems to produce the experience. These additional systems are controlled at each location of a version of the experience by the location's experience control system.

Each location of a version of the experience is identical and all participants are deemed to have partaken in the version of the real time physical reality immersive experience, not in a specific location of the version of the real time physical reality immersive experience. This facilitates the ability to have globalization of participants, such as global ranking systems, as well as segmentation of participants, such as geographic regional ranking systems.

Real Time

The real time physical reality immersive experience consists of people traversing a course in real time. The experience is designed to allow people to participate in the experience when they so choose at any time there is an available starting time.

Each participant's completion of the experience is unique to him or her and creates his or her own instance of the version of the real time physical reality immersive experience.

An instance is defined as a participant's completing of the experience.

Simultaneous Completion

The real time physical reality immersive experience is designed to allow completion of the experience by multiple participants simultaneously and independently of each other.

For example, participants 1, 2, and 3 could start their instances of the experience at 7:00 am. At 7:30 am, participant 1 could have completed their instance of the experience, participant 2 could be nearing the completion of their instance of the experience, and participant 3 could be at the halfway point of completing their instance of the experience. Also at 7:30 am, participant 4 could start their instance of the experience.

Participant Control

The real time physical reality immersive experience utilizes various methods, systems, and/or means to control participants during the experience. Some of these methods, means, and/or systems may utilize technology, software and/or hardware systems, to control participants. These methods, means, and/or systems may utilize positive and/or negative reinforcement principals to facilitate participant control.

Types of participant control include, but are not limited to, throughput, bottleneck alleviations, continual traversing of participants, prevention of backwards traversing where prohibited, time to complete instance, individual checkpoint and/or challenge time limits, and/or any other possible types of control over participants needed to facilitate the experience.

For example, to facilitate bottleneck alleviations, the experience control system could recognize a bottleneck of participants at a certain challenge, and then prevent participants from choosing that challenge until the bottleneck is cleared, before re-opening that challenge to be chosen.

Experience Accounts

All participants have a unique experience account that track, capture, record, and store their complete real time physical reality immersive experience history. Every instance of a version of the experience a participant completes creates a quantified dataset of the instance. These datasets are stored within the participant's experience account, the accumulation of which constitutes their complete real time physical reality immersive experience history.

Experience accounts also track, capture, record, and store a complete history of a person's external interactions with the experience. External interactions with the experience are further detailed below.

Unique Identifier

The real time physical reality immersive experience utilizes unique identifiers for each participant. Unique identifiers are defined as a physical technical device that is affixed to or within, each participant, or apparel worn by the participant, during the experience. Each participant is affixed with a unique identifier before the start of the experience. At the conclusion of an instance of the experience, participants have their unique identifiers removed so that the unique identifier can be reused for future participants.

Each unique identifier utilizes technology, software and/or hardware systems, to track, capture, record, and store any and all actions taken by the participant it's affixed to during the experience. Tracked, captured, recorded, and stored data and actions may include, but is not limited to, physical movement within three dimensional space, selected choice from a plurality of choices, physiological data of the participant, timestamps, and participant interactions with the experience systems and mechanisms.

These unique identifiers communicate with the experience control system in real time via data transmissions. These data transmissions allows the experience control system to track, capture, record, and store a quantified dataset of each participant's experience results as their own unique instance of the experience.

Experience Interaction Device

The real time physical reality immersive experience at times may utilize experience interaction devices for each participant. Experience interaction devices are defined as a physical technical device that is affixed to or within, each participant, or apparel worn by the participant, during the experience. When utilized, each participant is affixed with an experience interaction device before the start of the experience. At the conclusion of an instance of the experience, participants have their experience interaction device removed so that the experience interaction device can be reused for future participants.

The experience interaction devices and unique identifiers utilized by the real time physical reality immersive experience may or may not be integrated into a single physical technical device.

The experience interaction device allows participants to interact with the experience and receive real time feedback of their instance of the experience. The experience interaction device performs many functions, including, but not limited to, audio feedback such as sound effects, video feedback such as a real time point total of the participant's accumulated points during the instance up through present, a graphical user interface and control mechanisms for such uses as selecting and using expendables, external interactions with experience during a participant's instance, and/or any other mechanisms with which a participant could interact with the real time physical reality immersive experience.

The experience interaction devices are controlled by the experience control system in real time via data transmissions. The experience control system can control each experience interaction device independently, and collectively as a group of experience interaction devices, simultaneously.

Plurality of Choices

Referring now to FIG. 3, every checkpoint contains 1 or more challenges delineated into distinct pathways. For example, one checkpoint could have a 4 ft wall, 8 ft wall, and 12 ft wall delineated into 3 distinct pathways, one of which must be scaled.

For conceptual purposes, an example course could have 25 checkpoints, each with 3 different challenges, one of which must be chosen to complete, or attempt to complete, at each checkpoint. In this example, since participants are presented with 3 different choices at each checkpoint, being required to choose one of the three choices, there are over 847 billion possible different completion combinations through this conceptual course (3^25; 1 of 3 choices at each of 25 checkpoints.)

Data Capture Spots

Data capture spots are defined as technology, software and/or hardware systems, that interact with the unique identifiers, experience interaction devices, and experience control system in real time via data transmissions. A participant's unique identifier and/or experience interaction device passing through these data capture spots allows the experience control system to track, capture, record, and store a quantified dataset of the participant's instance of the experience. Tracked, captured, recorded, and stored data and actions may include, but is not limited to, physical movement within three dimensional space, selected choice from a plurality of choices, physiological data of the participant, timestamps, and participant interactions with the experience systems and mechanisms.

All courses contain start and finish data capture spots.

Each checkpoint contains at least one data capture spot.

Every challenge at each checkpoint contains at least one data capture spot.

Additional data capture spots may exist anywhere along a course to capture additional data, such as, within a challenge to track the completion or failure of participants who attempt the challenge.

User Defined

Participants make a conscious choice as to which challenge they choose to complete, or attempt to complete, or in the case of routes, which distinct route to take, at each checkpoint as they traverse the course. For example, one checkpoint could have a 4 ft wall, 8 ft wall, and 12 ft wall delineated into 3 distinct pathways, one of which must be scaled.

Each checkpoint and challenge utilizes its own individual data capture spot(s) to track, capture, record, and store each participant's individual choices and actions taken at every checkpoint and chosen challenge during the experience. The analysis of each participant's quantified dataset of an instance of the experience determines which of the nearly limitless completion combinations they traversed the course with.

Points System

The real time physical reality immersive experience utilizes a points system. The points system is designed to quantify the nearly limitless course completion combinations and actions taken during an instance of the experience in an easy to use and understand format.

Individual point values are assigned to each choice and some actions. Point values can be positive or negative values. At the conclusion of a participant's instance of the experience, the experience control system analyzes the participant's quantified dataset of the instance to calculate their accumulated points.

For example, using the conceptual checkpoint above, the 4 ft wall may have a 500-point value, the 8 ft wall may have a 1,500-point value, and the 12 ft wall may have a 3,000-point value. A participant who chooses to scale the 4 ft wall would receive 500 points. A participant who chooses to scale the 8 ft or 12 ft wall would receive 1,500 or 3,000 points respectively.

Real Time Experience Modifiers

The real time physical reality immersive experience at times may utilize real time experience modifiers. Real time experience modifiers are defined as technical, physical, mechanical, digital, software, hardware, and/or any other type of system used to affect the experience in real time as participants traverse a course. These modifiers may also be utilized to affect a participant's results of an instance of the experience.

Real time experience modifiers are controlled in real time by the experience control systems, version control systems, and/or master control system via data transmissions. Examples include, but are not limited to, completion and/or failure of challenges, bonuses, combos, expendables, power-ups, causality, and/or peripherals, each further detailed below.

Completion & Failure

Data capture spots may be utilized within a challenge to track, capture, record, and store whether a participant successfully completed the challenge, or if they failed at their attempt. Completion or failure of challenges allow for further variables, such as multiple point values for a single challenge, that are used within the above described points system and the below described result and ranking systems, to more accurately quantify datasets of participant's instances of the experience.

For example, one challenge could be a balance beam over a pool of water. If a participant successfully crosses the balance beam without falling into the pool, they will be able to pass through the data capture spot on the completion side of the challenge, accessible only by successfully completing the challenge. If a participant falls into the water before fully crossing the balance beam, thereby unsuccessfully completing the challenge, they would exit the pool through a separate exit on the side of the pool and pass through a separate data capture spot (failed attempt) before continuing along the course. Challenges with a failure component only allow participants to pass through one of these data capture spots; either the successful or failed data capture spots.

Bonuses

Bonuses are defined as numerical point values assigned to actions taken and/or meeting certain conditions during an instance of the experience. Bonuses may be awarded to participants during and/or after completion of an instance of the experience. Bonuses awarded are incorporated into the results of the participant's instance of the experience in which they are awarded.

For example, a 'fastest time of the day' bonus could be awarded to the participant who completes an instance of the experience with the shortest elapsed time each day.

Combos

Combos are a sub class of bonuses, defined as a specific chronological sequence of choices made and/or actions taken by a participant during an instance of the experience. Combos are considered performed when a participant has completed the specific chronological sequence during an instance of the experience.

For conceptual purposes, the above-described checkpoint consisting of challenges of a 4 ft wall, 8 ft wall, and 12 ft wall delineated into 3 distinct pathways, could be followed by a checkpoint with the above-described challenge of a balance beam over a pool of water. A 'high scaling balancer' combo could be awarded to participants who choose to scale the 12 ft wall and then successfully complete the balance beam challenge.

Expendables

Expendables are defined as physical items, digital goods, or similar mechanisms that participants may use at will during an instance of the experience to modify their instance of the experience that last for a duration of time during that instance. All digital goods expendables or similar mechanisms are stored in each participant's experience account. Expendables may be cumulative and multiple different expendables may be active simultaneously.

For example, a 'challenge redo' digital expendable could allow a participant to use it to re-attempt a failed challenge immediately upon failing that challenge.

Participants acquire expendables through a variety of means, including, but not limited to, earning them by completing instances of the experience, being awarded them as prizes, purchasing them with real and/or virtual currency, as additional rewards for performing combos, or by any other means of possible distribution or acquisition.

Power-Ups

Power-Ups are a sub class of expendables defined as mechanisms that modify a participant's instance of the experience in real time during the participant's instance of the experience, that last for a duration of time during that instance. Power-Ups can be activated and/or triggered by choices made, actions taken, combos performed, expendables, or by any analyzable means of a participant's quantified dataset of the instance of the experience. Power-ups may be cumulative and multiple different power-ups may be active simultaneously.

For example, a 'double points' power-up could be triggered for a participant who performs the above described 'high scaling balancer' combo. This conceptual power-up would modify the participant's instance of the experience by doubling the points received from their next challenge along the course.

Causality

The real time physical reality immersive experience at times may utilize causality to modify and/or enhance a participant's instance of the experience. Causality is defined as two chronological events, where the second is a consequence of the first. The first event is the cause, which leads to the second event, which is the effect. As it relates to causality, an event is defined as any quantifiable and/or analyzable event, or the analysis of quantifiable data or events.

For example, if a single participant makes the same choice at a specific checkpoint during every instance of the experience, the experience control system can modify the points the participant receives to be lower than the standard points the choice is worth for future instances of the experience for that participant. In this example, the effect (the second event) of the participant making the same choice repeatedly (the first event, the cause) is a negative reinforcement of point reduction.

Results & Rankings

At the conclusion of each participant's instance of the experience, their results and rankings are calculated using the points accumulated, the choices made, and the actions taken during their entire instance of the experience. The primary ranking system relies on points accumulated during the experience. This primary ranking system places participants in a descending order, with the participant accumulating the most points placing first, and the participant accumulating the least points placing last. This system is updated in real time whenever a participant completes an instance of the experience.

Additional result and ranking systems exist beyond the above-mentioned primary ranking system. These additional systems calculate their respective results and rankings utilizing any possible mathematical formula, with any combination of participant's quantified data as a portion of the formula's dataset and/or variables, including, but not limited to, physical movement within three dimensional space, selected choice from a plurality of choices, physiological data of participants, timestamps, and participant interactions with the experience systems and mechanisms. These additional result and ranking systems are updated in real time whenever a participant completes an instance of the experience.

Some of these additional result and ranking systems are designed as checklist and achievement systems to allow participants to analyze their complete experience history in a variety of ways and provide further game-like strategy and engagement within the real time physical reality immersive experience.

Participant result and ranking systems based on points accumulated, conscious choices made, and actions taken by each participant instead of a participant's elapsed time create a game-like strategy within the real time physical reality immersive experience.

Accumulated Experience Points (XP) & Levels

Each participant's unique experience account tracks, captures, records, and stores their complete real time physical reality immersive experience history. These accounts also track, capture, record, and store a participant's cumulative points received from each instance of the experience they complete.

A participant's cumulative total of points received from all completed instances of the experience is called XP, which stands for accumulated experience points. XP may be segmented into various types, including, but not limited to, total, yearly, date range, version, and/or any other means of possible segmentation.

Each type of XP may be further segmented into numerical ranges. These ranges are called levels. The levels for each type of XP may have different ranges for their respective levels.

For example: (1) Participant 1 completes their first instance of version A of the experience, receiving a total of 93,000 points. Upon completion of this instance of the experience, participant 1's Total XP is 93,000 and their Version A XP is 93,000. (2) Participant 1 completes their second instance of version A of the experience, receiving a total of 102,000 points. Upon completion of this instance of the experience, participant 1's Total XP is 195,000 and their Version A XP is 195,000. (3) Participant 1 completes their first instance of version B of the experience, receiving a total of 99,000 points. Upon completion of this instance of the experience, participant 1's Total XP is 294,000, their Version A XP is 195,000, and their Version B XP is 99,000. (4) Furthermore, if Total XP and Version A XP had ranges of 100,000 points, and Version B XP had ranges of 50,000 points, participant 1's Total XP Level is 3, their Version A XP Level is 2, and their Version B XP Level is 2.

The real time physical reality immersive experience utilizes XP and levels in a variety of ways, including, but not limited to, causality, unlocking of new challenges at checkpoints in future instances, gamification of frequency of instances, and/or any other potential use within the experience yet defined.

Pre-Experience Modifiers

The real time physical reality immersive experience at times may utilize pre-experience modifiers. Pre-experience modifiers are defined as technical, physical, mechanical, digital, software, hardware, and/or any other type of system used to affect the experience prior to a participant starting an instance of the experience. These modifiers may also be utilized to affect a participant's results of an instance of the experience.

Pre-experience modifiers are controlled by the experience control systems, version control systems, and/or master control system via data transmissions. Examples of pre-experience modifiers include, but are not limited to, experience modes, classes, and/or peripherals, each further detailed below.

Each participant chooses which, if any, pre-experience modifiers they would like their instance of the experience to utilize. Some pre-experience modifiers allow participants who have chosen different combinations of pre-experience modifiers for their instances to be completed simultaneously. Other pre-experience modifiers may require all participants completing their instances during the time these pre-experience modifiers are active to be utilizing this same combination of pre-experience modifiers.

Experience Modes

Experience modes are a sub class of pre-experience modifiers defined as operational protocols with which the experience control system utilizes to modify and control the experience to facilitate affecting a participant's instance of the experience, for that specific instance. Experience modes do not create a new version of the experience, only a modified experience of the version for a specific instance.

Experience modes include, but are not limited to, standard participant experience, participant versus experience, participant versus participant, participant versus team, team versus team, team versus experience, individual time trial, team time trial, and/or any possible operational protocols utilized to modify and control a participant's instance of the experience.

For example, an experience mode called physical individual time trial could modify the experience, such as prohibiting participants from choosing any non-physical challenge from a plurality of challenge choices, to facilitate participants running through the course in an attempt to complete the course in the shortest elapsed time.

Classes

Classes are a sub class of pre-experience modifiers defined as participant archetype protocols with which the experience control system utilizes to modify and control a participant's instance of the experience. Prior to starting an instance, a participant may choose if allowed, to select a class to complete the instance as. Modifications of the instance of the experience include, but are not limited to, limiting available challenge choices at checkpoints, point modifiers deviating from standard, time limits to complete certain aspects of the experience, penalties for specific actions taken by the participant, and/or any other means of modifying an instance of the experience from its standard of not utilizing a class.

For example, a class called athlete could prohibit the participant from choosing any challenge that did not contain a physical or dexterous activity.

Peripherals

Peripherals may be utilized as either and/or both pre-experience and real time experience modifiers. Peripherals are defined as physical technical or mechanical devices that participant's may utilize to interact with the experience. Interactions include, but are not limited to, completing challenges, performing combos, using an expendable, activating a power up, and/or any other means of possible interaction with the experience. A Participant at times may utilize multiple peripherals simultaneously.

Peripherals utilize unique identifiers to distinguish individual peripherals from each other. Peripherals also utilize technology, software and/or hardware systems, to communicate with the experience control system in real time via data transmissions. These unique identifiers and technology utilized by peripherals allow the experience control system to track, capture, record, and store a quantified dataset of a participant's interaction between themselves, the peripheral, and the experience during a participant's instance of the experience. Quantified data includes, but is not limited to, trajectory, velocity, speed, impact, force, rotational direction, timestamps, and/or any other possible data that can be quantifiably tracked, captured, record, and stored. The experience control system can control each peripheral independently, and/or collectively as a group of peripherals, simultaneously.

For example, a challenge could consist of a participant throwing a ball at a target. The ball is considered a peripheral. The experience control system can track, capture, record, and store quantifiable data of a participant throwing the ball at the target, such as detecting a successful strike of the ball on the target.

Modular Efficiently Transformable Assembly Structure (METAS)

Referring now to FIGS. 5 through 10, the real time physical reality immersive experience at times utilizes a novel form of structural and mechanical engineering called Modular Efficiently Transformable Assembly Structure (METAS) to produce components of the experience. METAS allows the experience to be configured and reconfigured in a time and cost efficient manner.

Figure 5:
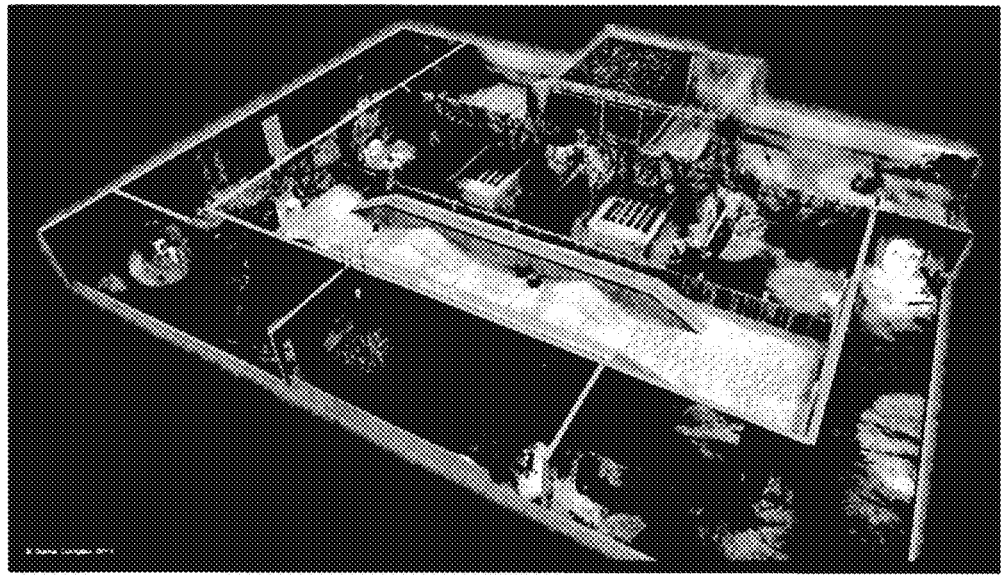
FIG. 5 shows a building plan of an exemplary game environment of the instant disclosure.

Modular components of the METAS system includes, but is not limited to, structural engineering components such as walls and beams, transformable components such as pocket doors and sliding panels, semi-permanent floors and ceilings, hinges, couplers, joints, braces, tracks, risers, stairs, HVAC, and/or any other possible structural and/or mechanical components of the system. FIG. 5 shows an example of the readily assembleable hardware infrastructure components. Modular beam 1, connects to modular joint 2, framing modular wall 3, with modular ceiling/floor 4 and HVAC 5.

METAS may be utilized to produce varies components of the experience, including, but not limited to, courses, checkpoints, challenges, pathways, and/or any other possible components of the experience.

Immersive Experiences

The real time physical reality immersive experience at times utilizes numerous technologies, production methods, processes, protocols, and other similar means to create a highly immersive experience for participants.

Figure 6:
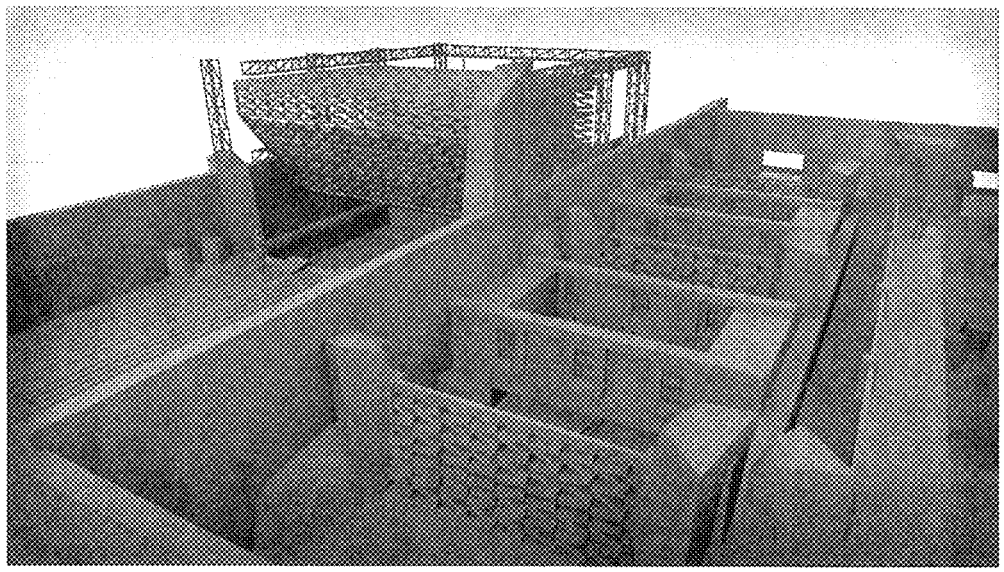
FIG. 6 shows a construction schematic of the modular structural elements being assembled into an exemplary game environment of the instant disclosure.
Figure 7:
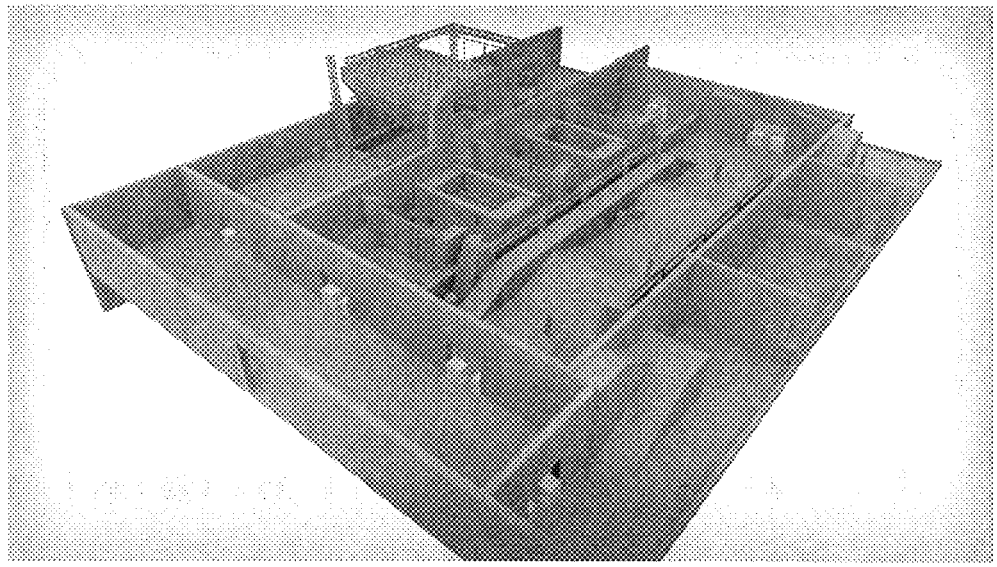
FIG. 7 shows a construction schematic of the modular structural elements being assembled into an exemplary game environment of the instant disclosure.
Figure 8:
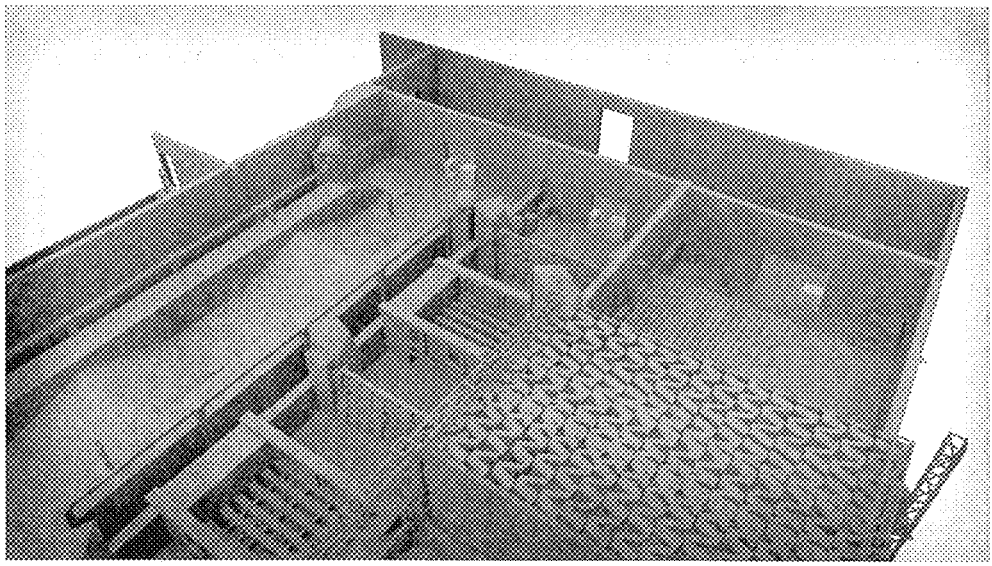
FIG. 8 shows a construction schematic of the modular structural elements being assembled into an exemplary game environment of the instant disclosure.
Figure 9:
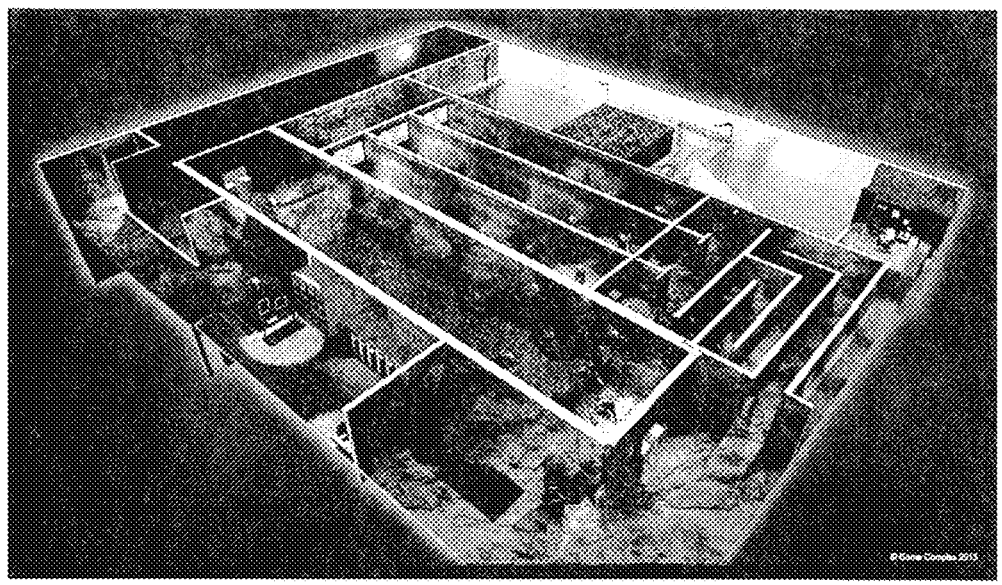
FIG. 9 shows a building plan of an assembled exemplary game environment of the instant disclosure.
Figure 10:
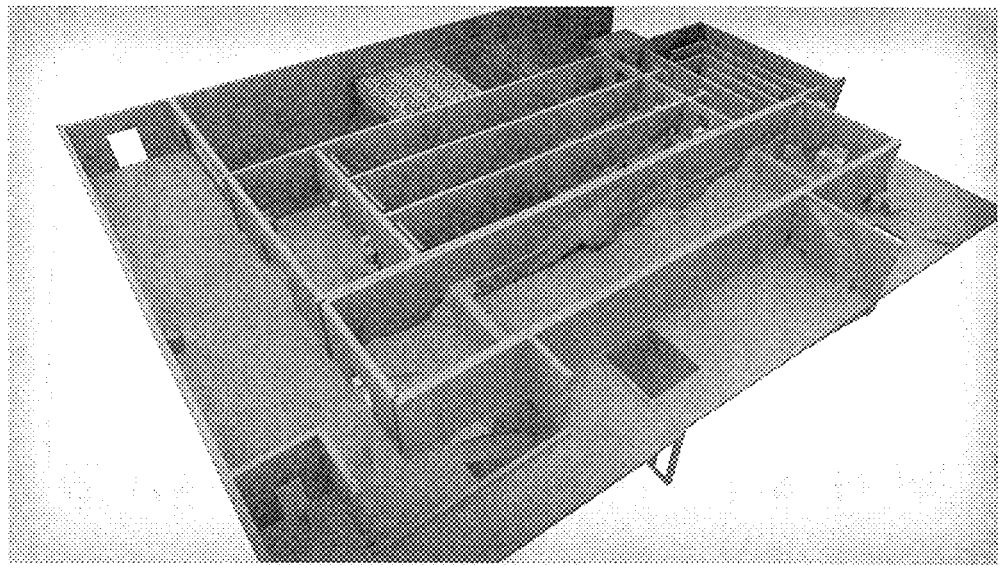
FIG. 10 shows a construction schematic of the modular structural elements being assembled into an exemplary game environment of the instant disclosure.
Figure 11:
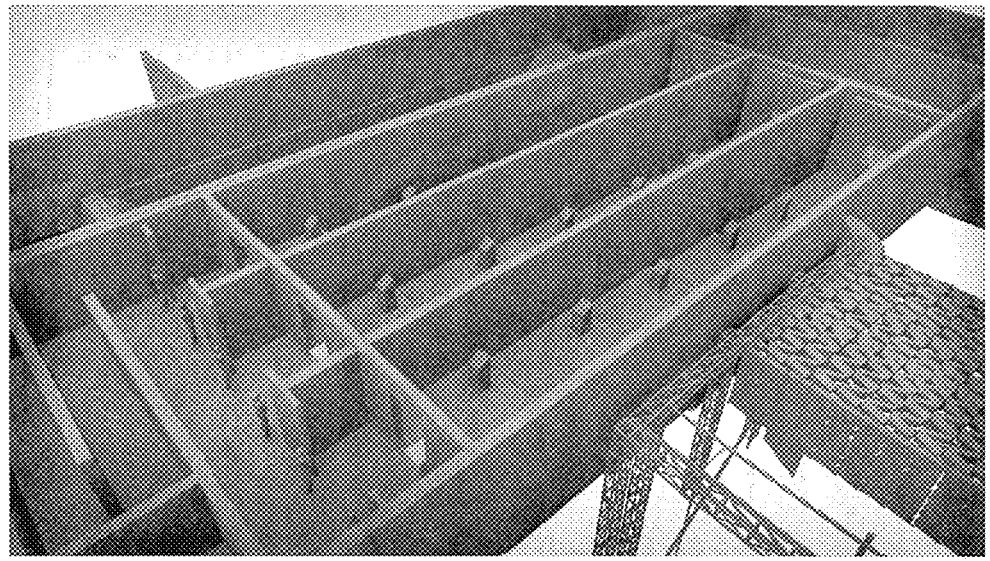
FIG. 11 shows a construction schematic of the modular structural elements being assembled into an exemplary game environment of the instant disclosure.
Figure 12:
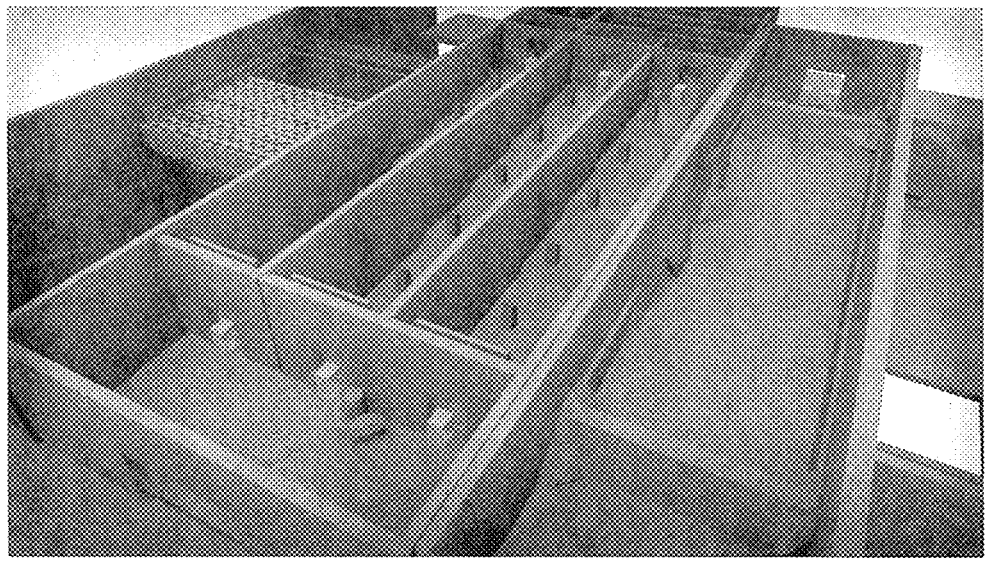
FIG. 12 shows a construction schematic of the modular structural elements being assembled into an exemplary game environment of the instant disclosure.
Figure 13:
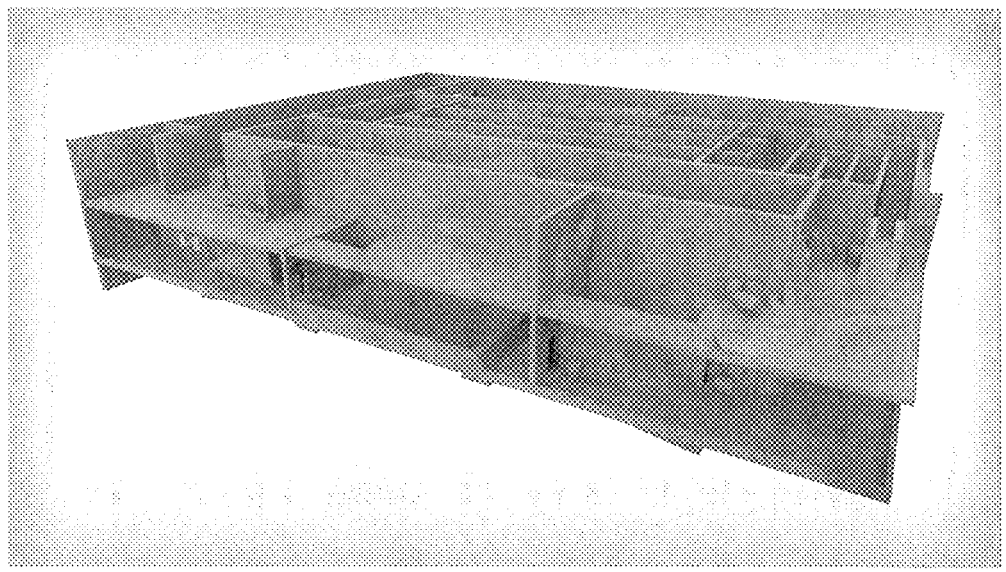
FIG. 13 shows a construction schematic of the modular structural elements being assembled into an exemplary game environment of the instant disclosure.
Figure 14:
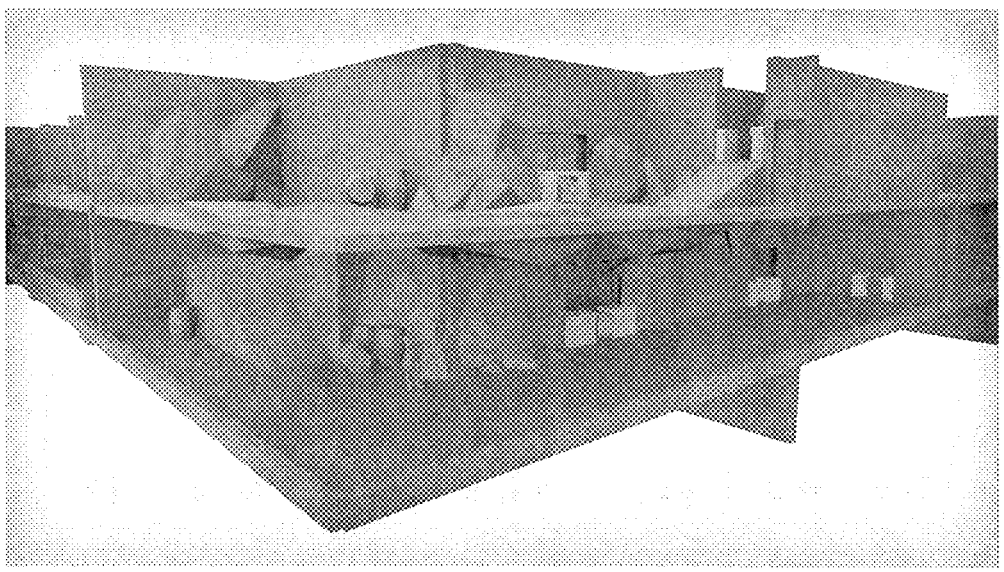
FIG. 14 shows a construction schematic of the modular structural elements being assembled into an exemplary game environment of the instant disclosure.
Figure 15:
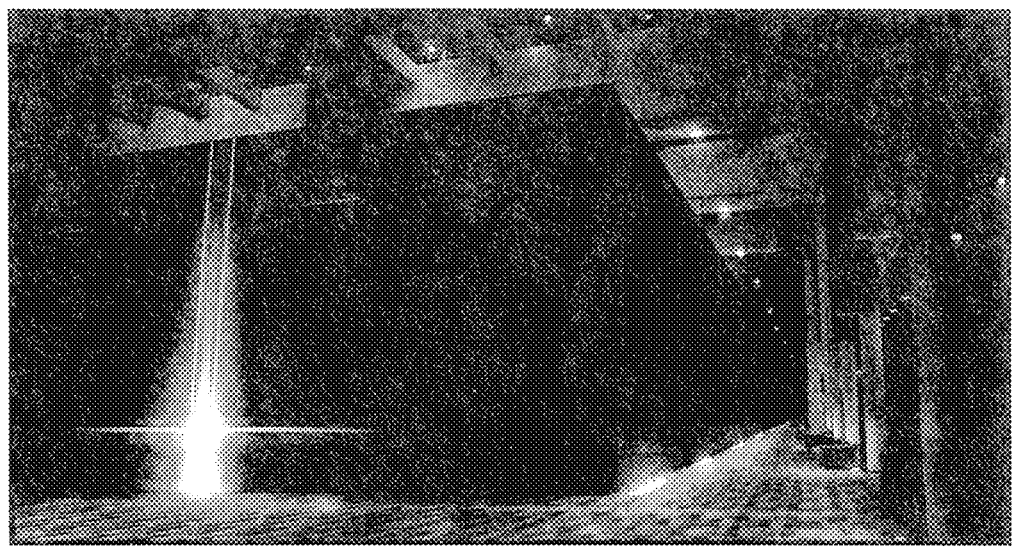
FIG. 15 shows an exterior view of an assembled exemplary game environment of the instant disclosure.

Immersive is defined as providing stimulation to any combination of senses. FIG. 6 shows two exemplary environments.

Technology utilized to create this immersive experience includes, but is not limited to, scenic design, environment design and control, HVAC, game design, overarching stories, audio and video effects, special effects, lighting, METAS, non-participant people within experience, and/or any other possible means of immersing participants in the experience.

Some of this technology is controlled by the experience control system in real time via data transmissions; the experience control system can control this technology independently, and/or collectively as a group of technology, simultaneously. Some of the immersive experience technology communicate and/or interact with other components of the experience, such as a participant's unique identifier, to facilitate the ability to track, capture, record, and store a participant's quantified dataset of their instance of the experience.

For example, a challenge could consist of a participant throwing a ball at a target. If the ball hits the target, a sound effect could be played through speakers within the challenge to provide an audio feedback to the participant relating to their individual action.

Controlled Environment

FIGS. 7 through 15 likewise show detailed views of exemplary controlled environments. The real time physical reality immersive experience at times utilizes HVAC and other technology systems to control the environment of the experience. Controlled environmental components include, but are not limited to, temperature, humidity, pressure, airflow, precipitation, chemical elements, smells, and/or any other possible environmental components. These technology systems allow each course, checkpoint, and challenge to have its own environment design and configuration. These technology systems are controlled by the experience control system in real time via data transmissions; the experience control system can control these systems independently, and/or collectively as a group of systems, simultaneously.

For example, a checkpoint could consist of two challenges, the first challenge requiring participants to cross a mountain pass, the second challenge requiring participants to traverse an underground cave. The experience control system can control the temperature and airflow of each challenge independently and simultaneously, such that the first challenge is cold and windy, and the second challenge is damp, cold, and has a stagnant airflow.

The real time physical reality immersive experience at times utilizes fiction and/or non-fiction stories, themes, narratives, characters, or similar means to immerse participants in the experience. Presenting, representing, and conveying these means are achieved utilizing a variety of methods, including, but not limited to, visually, aurally, utilization of scenery, environment design and control, technology, and/or any other possible methods of presenting, representing, and conveying these fiction and/or non-fiction stories, themes, narratives, or similar means to participants. Some of these means may be controlled by the experience control system in real time via data transmissions; the experience control system can control these means independently, and/or collectively as a group, simultaneously.

Overarching Story

For example, a version of the experience could have a jungle setting, theme, and story consisting of a fictionalized native population of the jungle setting as its characters of the story. In this example, all components of the experience would fit within this created world, including, but not limited to, the course, checkpoints, challenges, scenic design, environment design, fictionalized characters, participant interactions with the experience, and/or any other components necessary to create this immersive experience.

Non-Participant People within Experience

The real time physical reality immersive experience at times may utilize non-participating people within the experience. These non-participating people are utilized to facilitate various aspects of the experience, including, but not limited to, participant control, immersive experience enhancement, conveying of the overarching story, as means of experience interaction, awarding bonuses, and/or any other possible uses yet defined.

Non-participating people are recruited, trained, and implemented within the experience by the operations team.

Continuous Progression of the Experience

The real time physical reality immersive experience is designed to allow continuous progression of the experience. Continuous progression of the experience is defined that each version of the experience will change over time. Components that may change in each version of the experience include, but are not limited to, the course layout, checkpoints, challenges, point values, immersive experience components, and/or any other components with which the experience may be progressed. Progression of a version of the experience does not create a new version of the experience, only an updated (modified) experience of the version.

Progression occurs according to a progression schedule, which is defined as a rate of change over time between each progression of a version of the experience. Multiple progression schedules may be utilized simultaneously to progress various components of a version of the experience independently.

For example, version A of the experience could have a one year overall progression schedule. This would signify that version A of the experience changes each year. Using the example above, if the first year of version A of the experience has a jungle setting, theme, story, and experience; the second year of version A of the experience could have an island setting, theme, story, and experience.

Media Capture Equipment

The real time physical reality immersive experience at times utilizes media capture equipment. Media capture equipment is defined as technology, software and/or hardware systems and/or devices, used to capture, record, and store various types of media, including, but not limited to, cameras, microphones, accessories, and/or the technology utilized to control such technology.

This media capture equipment is utilized to capture, record, and store a robust media library of each instance of the experience, including, but not limited to, photographs, videos, audio, and/or any other possible forms of media. This equipment is controlled by the media control system in real time via data transmissions; the media control system can control this equipment independently, and/or collectively as a group of equipment, simultaneously. The media control system communicates with the experience control system in real time via data transmissions.

Real Time Media Tagging

The real time physical reality immersive experience at times utilizes real time media tagging. Media tagging is defined as an automated process of identifying characteristics of a segment of media and applying a set of quantified data to the segment. Quantified data characteristics include, but are not limited to, media type, timestamps, unique participants included in segment, contents, location data of where media was captured, and/or any other quantifiable data that can be tracked, captured, recorded, and stored for a segment of media.

The media control system controls real time media tagging. This system communicates in real time via data transmissions with all other technical systems of the experience, including, but not limited to, the experience control system, version control system, master control system, media capture equipment, data capture spots, unique identifiers, experience interaction devices, environment control technology, and/or any other technical system of the experience.

The media control system utilizes these media tags to facilitate a variety of functions, including, but not limited to, cataloging the media library, querying the media library, facilitating the broadcast of live streams of the media, and/or any other possible functions.

An example of an automated process of media tagging of participants during an instance of the experience is as follows: (1) Challenge A has a video camera affixed at it, recording video of the challenge; (2) The video camera is controlled by the media control system; (3) The challenge has two data capture spots, one at the starting point of the challenge, one at the finishing point of the challenge; (4) As a participant's unique identifier passes through each of the challenge's data capture spots, a timestamp of the event is created; (5) The media tagging control system, utilizing the timestamp data of these two events, tags the segment of the challenge's video file during which the participant traversed through the challenge with the participant's experience account number.

Broadcast Streaming

The real time physical reality immersive experience at times may broadcast live media streams of the experience to various distribution channels and devices, including, but not limited to, online websites and applications, mobile applications, satellite and television broadcasts, and/or any other possible forms of distribution.

Live broadcast streaming of the experience is controlled by the streaming control system, which is a technical system of software and/or hardware systems that controls the distribution of data of the experience to various distribution channels and devices. The streaming control system can simultaneously stream to multiple internal and external distribution channels and devices.

For example, the streaming control system at times may broadcast an internal stream of data, such as a CCTV feed, to various distribution channels and devices connected to a location of the experience, such as the operator control room; while simultaneously broadcasting a live stream of an instance of the experience through a website application for external spectating of the instance of the experience.

Real Time Results Streaming

The real time physical reality immersive experience at times may stream results of instances of the experience in real time as instances are occurring to various distribution channels and devices, including, but not limited to, social media platforms, web applications, mobile applications, media broadcasts, and/or any other possible forms of distribution. Real time results streaming of the experience is controlled by the streaming control system.

Real time results streams at times may be synced with live media broadcast streams of the experience to form a combined single steam of media and results.

External Interactions with Experience

The real time physical reality immersive experience is designed to allow external interactions with the experience. External interactions are defined to include, but are not limited to, actions, mechanisms, technical systems of the experience, and/or any other possible component of the experience, which at times may be controlled remotely by an external non-participating person.

External interactions are controlled by the external interaction control system, which is a technical system of software and/or hardware systems that controls external interactions with the experience. The external interaction control system communicates with other systems of the experience in real time via data transmissions.

For example, a challenge could require a participant to throw a ball at a moving target. At times, the movement pattern of this target would be controlled by the experience control system. At other times an external non-participating person, such as a participant's friend, could control the movement pattern of this target through the external interaction control system. In this scenario, the non-participating person would utilize a digital application or physical device consisting of a user interface and control mechanisms to control the movement pattern of the target, thereby facilitating the external interaction with the experience.

All people interacting with the experience externally utilize their own experience account, which will track, capture, record, and store the person's complete history of their external interactions with the experience.

Virtual Currency & Synthetic Economy

The real time physical reality immersive experience at times may utilize virtual currency(s) and/or synthetic economy(s).

Virtual currency is defined as electronic money that acts as an alternative currency used to facilitate the exchange of physical and/or virtual goods. A single virtual currency may be utilized for all versions of the experience, or certain versions of the experience may utilize its own virtual currency.

Synthetic economy is defined as an emergent economy, existing in a persistent reality, exchanging physical and/or virtual goods. As it relates to the real time physical reality immersive experience, the persistent reality is the experience, its participants, and non-participating people externally interacting with the experience. A single synthetic economy may emerge encompassing all versions of the experience, multiple synthetic economies may emerge for all versions of the experience, and/or individual synthetic economies may emerge for each version of the experience.

Gamification of Actions

Gamification is defined as the application of typical elements of game playing (e.g. point scoring, competition with others, rules of play, game mechanics) to other areas of activity and/or non-game contexts.

Multiple components of the real time physical reality immersive experience detailed within this disclosure, including, but not limited to, physical medium, a plurality of choices, user defined choices and actions, the points system, experience modifiers, causality, results and rankings, XP and levels, continuous progression of the experience, external interactions with experience, and/or any other components of the experience, create a game-like strategy within the experience that constitutes gamification of actions taken in physical reality.

Simulated Reality Extensions

Some versions of the real time physical reality immersive experience at times may utilize simulated reality extensions. Simulated reality extensions are defined as digital mediums that people may utilize to interact with the experience, and/or complete instances of the experience, in a non-physical way, including, but not limited to, video games, mobile games, web and mobile applications, and/or any other possible method of simulated reality interaction.

For example, a version of the experience could be replicated as a simulated reality video game. Participants could complete instances of the experience in real time physical reality, and/or in the simulated reality.

While the method and apparatus have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

Such terms should be interpreted in their most expansive forms so as to afford the applicant the broadest coverage legally permissible.

What is claimed is:

1. A system for gamification of real time physical reality immersive experiences, comprising, in combination:
   At least a physical medium comprising multiple checkpoints at locations arrayed along a course, each checkpoint comprising a data capture spot to capture choices of multiple independent users traversing the course;
   at least one unique identifying device for connecting to and monitoring the progress of at least one of the users;
   a master control system operatively linked to the physical medium;
   a versioning control system whereby the users may complete real time physical reality immersive experiences simultaneously;
   wherein the master control system simultaneously manages, for the multiple independent users, challenge interactions with checkpoints and resultory scoring totals as the users traverse the course, while being interactively viewed by both multiple independent users and other observers of said system;
   further comprising an operations team who design, program, manage, control, and update involved control systems;
   wherein the versioning control system comprises versioning software and communication interfaces along with hardware implementing the same;
   wherein the system is operable to produce multiple versions existing concurrently at locations which are remote relative to each other while being interactively viewed by both multiple independent users and other observers of said system.

2. A system for gamification of real time physical reality immersive experiences, comprising, in combination:
   At least a physical medium comprising multiple checkpoints at locations arrayed along a course, each checkpoint comprising a data capture spot to capture choices of multiple independent users traversing the course;
   at least one unique identifying device for connecting to and monitoring the progress of at least one of the users;
   a master control system operatively linked to the physical medium;
   a versioning control system whereby the users may complete real time physical reality immersive experiences simultaneously;
   wherein the master control system simultaneously manages, for the multiple independent users, challenge interactions with checkpoints and resultory scoring totals as the users traverse the course, while being interactively viewed by both multiple independent users and other observers of said system;
   further comprising an operations team who design, program, manage, control and update involved control systems;
   wherein the versioning control system comprises versioning software and communication interfaces along with hardware implementing the same;
   wherein the system is operable to produce multiple versions existing concurrently at locations which are remote relative to each other while being interactively viewed by both multiple independent users and other observers of said system;
wherein each location of a subject experience is identical and all participants are deemed to have participated in a contemporaneous version of the involved real time physical reality immersive experience.

* * * * *

UNITED STATES PATENT AND TRADEMARK OFFICE
CERTIFICATE OF CORRECTION

PATENT NO. : 10,016,683 B2
APPLICATION NO. : 14/482728
DATED : July 10, 2018
INVENTOR(S) : Brian Fahmie It is certified that error appears in the above-identified patent and that said Letters Patent is hereby corrected as shown below:

On the Title Page

ABSTRACT

2nd Line: gameification
SHOULD BE: gamification

3rd Line: endurance events and gaming aspects to create a novel entertainments systems,
SHOULD BE: endurance events and gaming aspects to create novel entertainment systems, In the Specification

SUMMARY OF THE DISCLOSURE

Column 2, Line 27: Briefly stated, the summation of this disclosure collectively creates a real time physical reality immersive experience having gameification of actions taken in physical reality.
SHOULD BE: Briefly stated, the summation of this disclosure collectively creates a real time physical reality immersive experience having gamification of actions taken in physical reality.

Column 3, Line 6: having gameification of actions taken in physical reality.
SHOULD BE: having gamification of actions taken in physical reality.

DETAILED DESCRIPTION OF THE DISCLOSURE

Under Physical Medium: 2nd Line: competitions and gaming to generate gamefication of real
SHOULD BE: competitions and gaming to generate gamification of real Signed and Sealed this
Twenty-ninth Day of January, 2019

Andrei Iancu
*Director of the United States Patent and Trademark Office*